United States Patent
Kinzie et al.

(10) Patent No.: US 7,945,350 B2
(45) Date of Patent: May 17, 2011

(54) WIND TURBINE ACOUSTIC EMISSION CONTROL SYSTEM AND METHOD

(75) Inventors: Kevin Kinzie, Moore, SC (US); Stefan Herr, Greenville, SC (US); Benoit Petitjean, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/498,798

(22) Filed: Jul. 7, 2009

(65) Prior Publication Data

US 2010/0133819 A1    Jun. 3, 2010

(51) Int. Cl.
| | |
|---|---|
| G05B 13/00 | (2006.01) |
| G05B 15/00 | (2006.01) |
| G05D 3/12 | (2006.01) |
| G05D 17/00 | (2006.01) |
| F01N 5/00 | (2006.01) |
| F03D 9/00 | (2006.01) |
| F03D 7/02 | (2006.01) |
| H02P 9/04 | (2006.01) |
| F04D 29/18 | (2006.01) |
| F04D 29/26 | (2006.01) |
| F04D 29/36 | (2006.01) |
| F03B 15/06 | (2006.01) |
| B64C 11/06 | (2006.01) |
| B64C 11/12 | (2006.01) |
| B64C 11/30 | (2006.01) |
| B64C 27/00 | (2006.01) |
| B63H 3/00 | (2006.01) |
| B63H 7/00 | (2006.01) |
| F01D 5/00 | (2006.01) |
| F01D 7/00 | (2006.01) |

(52) U.S. Cl. .......... 700/280; 700/287; 181/211; 290/44; 290/55; 415/1; 415/4.1; 416/1; 416/41; 416/132 B; 416/147

(58) Field of Classification Search .............. 700/34, 700/287–290, 280; 290/43, 44, 54, 55; 415/1, 415/2.1, 4.1–4.3; 416/1, 31, 40, 41, 132 B, 416/147, 223 R, 228; 73/1.29; 181/211
See application file for complete search history.

(56) References Cited

U.S. PATENT DOCUMENTS

| | | | |
|---|---|---|---|
| 6,116,857 A * | 9/2000 | Splettstoesser et al. ...... | 416/228 |
| 6,688,841 B1 | 2/2004 | Wobben | |
| 6,834,829 B2 * | 12/2004 | Dunagin, Jr. ................ | 244/26 |
| 6,966,754 B2 | 11/2005 | Wobben | |
| 7,118,338 B2 | 10/2006 | Moroz et al. | |
| 7,275,912 B2 | 10/2007 | Steudel | |
| 7,352,075 B2 | 4/2008 | Willey et al. | |
| 7,352,076 B1 * | 4/2008 | Gabrys ......................... | 290/44 |
| 7,420,289 B2 | 9/2008 | Wang et al. | |

(Continued)

FOREIGN PATENT DOCUMENTS

EP    1944667 A1    1/2008

(Continued)

*Primary Examiner* — Crystal J Barnes-Bullock
(74) *Attorney, Agent, or Firm* — McNees Wallace & Nurick LLC

(57) ABSTRACT

A system and method for controlling noise generated from a wind turbine is disclosed. The method includes selectively adjusting the angle of pitch of the blade in response to an amount of noise generated being above a predetermined amount and maintaining the amount of noise generated at or below the predetermined amount of noise.

18 Claims, 5 Drawing Sheets

U.S. PATENT DOCUMENTS

| | | | |
|---|---|---|---|
| 7,437,264 B2 | 10/2008 | Pierce et al. | |
| 2007/0031237 A1 | 2/2007 | Bonnet | |
| 2007/0085343 A1 | 4/2007 | Fortmann | |
| 2007/0183885 A1* | 8/2007 | Ormel et al. | 415/4.1 |
| 2007/0205603 A1* | 9/2007 | Appa et al. | 290/55 |
| 2008/0069692 A1* | 3/2008 | Oohara et al. | 416/31 |
| 2008/0086281 A1 | 4/2008 | Santos | |
| 2008/0103611 A1* | 5/2008 | Altemark | 700/34 |
| 2008/0136188 A1 | 6/2008 | Krueger | |
| 2008/0164091 A1* | 7/2008 | Kerber | 181/211 |
| 2008/0175711 A1* | 7/2008 | Godsk et al. | 416/147 |
| 2008/0206055 A1* | 8/2008 | Godsk et al. | 416/147 |
| 2008/0240923 A1* | 10/2008 | Bonnet | 416/223 R |
| 2008/0307853 A1* | 12/2008 | Siebers et al. | 73/1.29 |
| 2009/0074574 A1* | 3/2009 | Godsk et al. | 416/41 |
| 2009/0087314 A1* | 4/2009 | Haag | 416/147 |
| 2009/0099702 A1* | 4/2009 | Vyas et al. | 700/287 |
| 2009/0169378 A1* | 7/2009 | Menke | 416/1 |
| 2010/0135798 A1 | 6/2010 | Eggleston | |

FOREIGN PATENT DOCUMENTS

| | | | |
|---|---|---|---|
| EP | 2000665 A2 | | 10/2008 |
| GB | 2067248 A | | 7/1981 |
| JP | 56023599 A | * | 3/1981 |
| JP | 01227899 A | * | 9/1989 |
| JP | 08049698 A | * | 2/1996 |
| JP | 2004293527 A | * | 10/2004 |
| WO | 03/064853 A1 | | 8/2003 |
| WO | 2008145126 A2 | | 12/2008 |

* cited by examiner

WIND TURBINE ACOUSTIC EMISSION CONTROL SYSTEM AND METHOD

FIELD

The present disclosure is directed to a system for controlling the operation of a wind turbine, and specifically to a system which meets specified noise levels with minimal loss in energy yield.

BACKGROUND

Wind energy systems have gained more and more importance as a source of energy in recent years. As areas suitable for their economical operation are relatively scarce in a number of countries, a growing number of wind energy systems are located close to populated areas. As the running of wind turbines in wind energy systems causes noise, this leads to various problems such as resistance from neighborhoods and the like. A variety of factors contribute to the overall noise emission of such systems such as machinery noise emissions (of tonal nature) and aerodynamic noise emissions (more broad in nature).

Methods for reducing the noise emissions of wind energy systems have long been discussed. For example, it has been proposed to reduce aerodynamic noise caused by the blades through a speed/torque control of the system in order to keep turbine speed low during certain time intervals, e.g., during night time.

It is well established that in order to limit the noise generated by a wind turbine blade, the maximum tip speed at which the blades rotate can be reduced. The limitation of the tip speed requires a reduction in the rated power to limit the torque generated in the drive train of the turbine. This reduces the annual energy yield of the turbine.

What is needed is a method and system of limiting the noise generated by a wind turbine with reduced or eliminated reduction in tip speed.

SUMMARY

In an exemplary embodiment, a method for controlling noise generated from a wind turbine includes selectively adjusting the angle of pitch of the blade in response to an amount of noise generated being above a predetermined amount, and maintaining the amount of noise generated at or below the predetermined amount of noise.

In another exemplary embodiment, a wind turbine includes at least one blade operably mounted on the wind turbine, the at least one blade attached to a rotor having a rotor shaft, the rotor shaft in communication with a generator, the generator configured for converting torque into electrical power, and a controller configured for selectively adjusting an operating parameter in response to noise generated being above a predetermined value. In the embodiment, the operating parameter can be an angle of pitch of the at least one blade.

In another exemplary embodiment, a wind turbine farm includes a plurality of wind turbines. In the embodiment, at least one of the plurality of wind turbines includes at least one blade operably mounted on the wind turbine, the at least one blade attached to a rotor having a rotor shaft, the rotor shaft in communication with a generator, the generator configured for converting torque into electrical power, and a controller capable of selectively adjusting an operating parameter in response to noise generated being above a predetermined amount of noise. In the embodiment, the operating parameter can be an angle of pitch of the at least one blade.

One advantage of the present disclosure is permitting control and/or reduction of acoustical emissions with little or no loss in energy production.

Another advantage of the present disclosure is that a control system and methodology can be easily implemented in wind systems with little or no additional equipment or hardware.

Another advantage of the present disclosure is the ability to maintain the wind turbine nominal tip speed even during times when acoustical emissions are limited.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically, mechanical energy converted from kinetic energy of wind, for a predetermined purpose other than generating electrical power, such as, but not limited to, pumping a fluid and/or grinding a substance. As used herein, the term "tip speed ratio" is intended to be representative of any ratio of the blade-tip speed by the wind speed at hub height.

Figure 1:
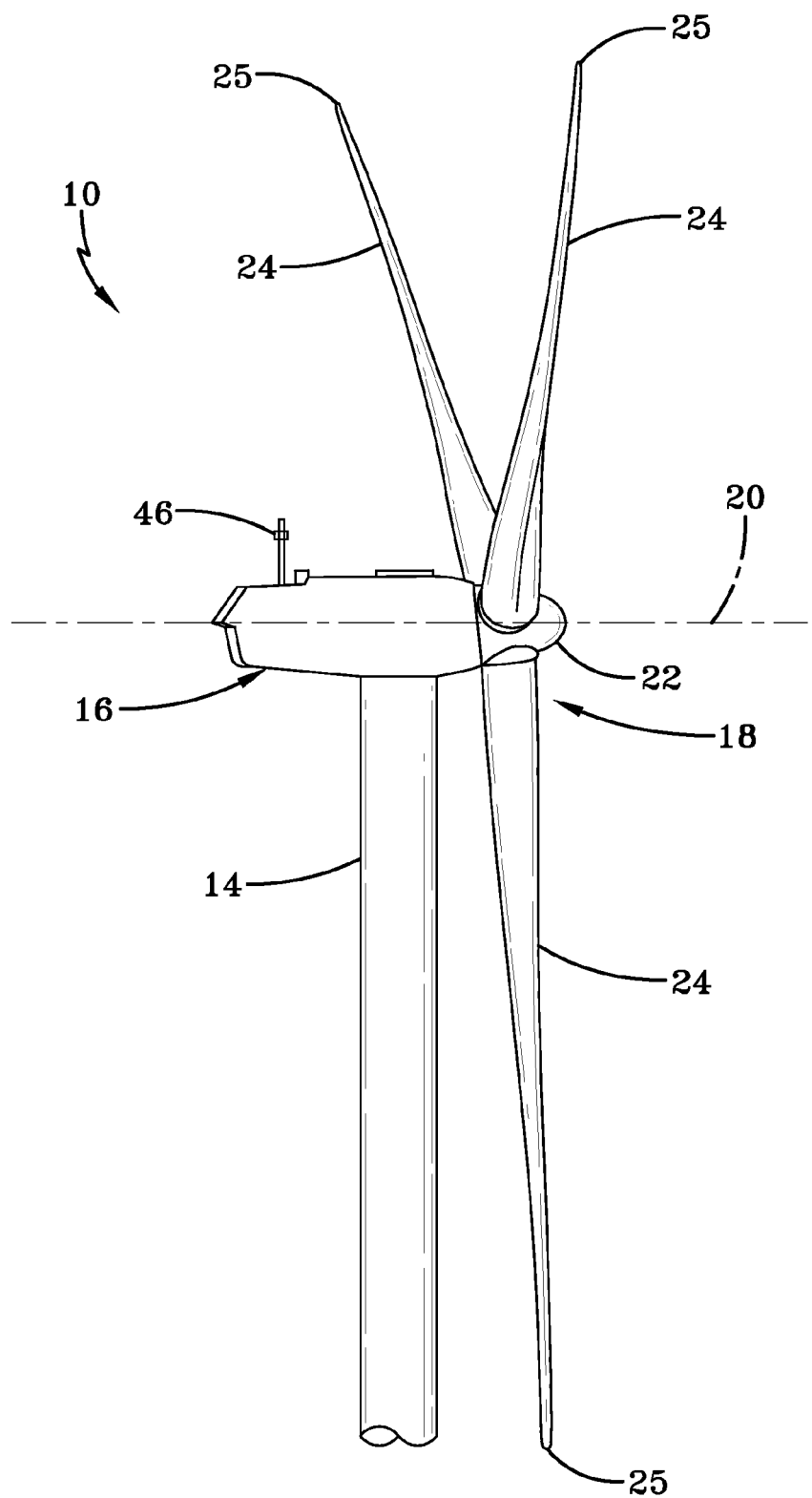
FIG. 1 is a perspective view of an exemplary embodiment of a wind turbine in accordance with the disclosure.
Figure 2:
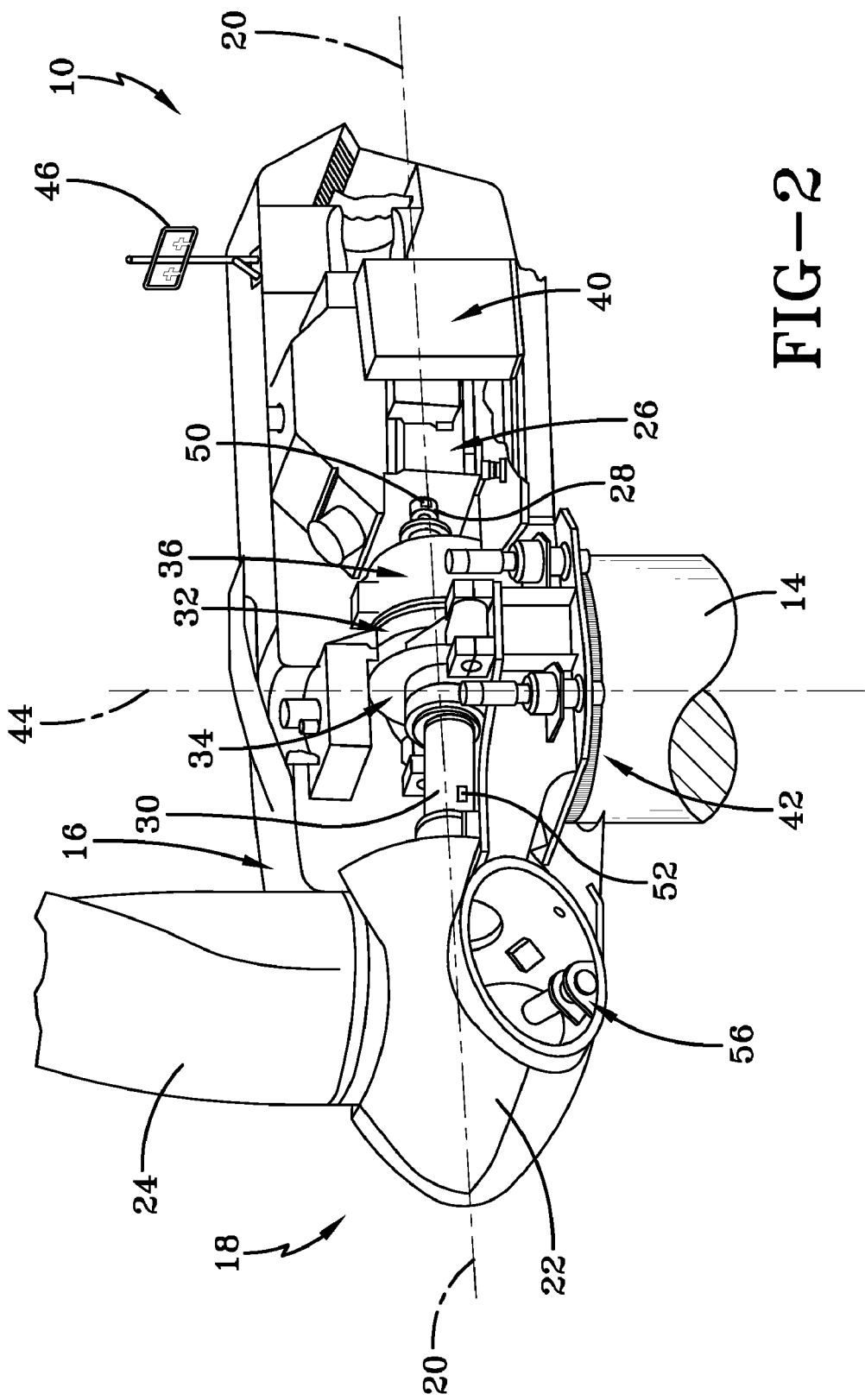
FIG. 2 is a partially cut-away perspective view of a portion of the wind turbine shown in FIG. 1 in accordance with an embodiment of the present disclosure.
Figure 3:
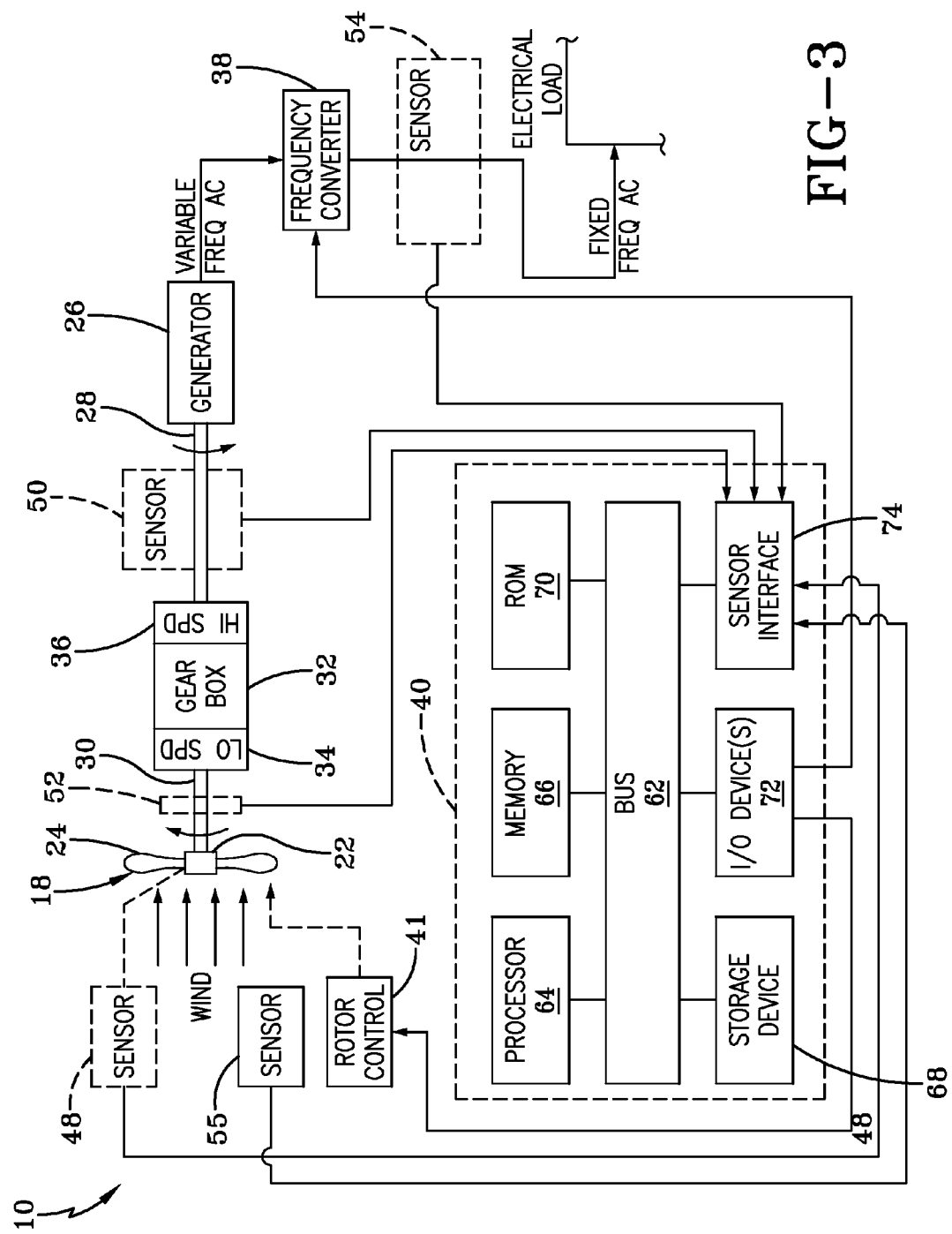
FIG. 3 is a schematic diagram of the wind turbine shown in FIGS. 1 and 2.

FIG. 1 is a perspective view of an exemplary wind turbine 10 in accordance with an embodiment of the present disclosure. FIG. 2 is a partially cut-away perspective view of a portion of wind turbine 10 in accordance with an embodiment of the present disclosure. FIG. 3 is a schematic diagram of wind turbine 10. Wind turbine 10 described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown) for receiving electrical power therefrom to drive operation of wind turbine 10 and/or its associated components and/or for supplying electrical power generated by wind turbine 10 thereto. Although only one wind turbine 10 is shown in FIGS. 1-3, in some embodiments a plurality of wind turbines 10 may be grouped together, sometimes referred to as a "wind farm".

Wind turbine 10 includes a body 16, sometimes referred to as a "nacelle", and a rotor (generally designated by 18) coupled to body 16 for rotation with respect to body 16 about an axis of rotation 20. In the exemplary embodiment, nacelle 16 is mounted on a tower 14. The height of tower 14 may be any suitable height enabling wind turbine 10 to function as described herein. Rotor 18 includes a hub 22 and a plurality of blades 24 (sometimes referred to as "airfoils") extending radially outward from hub 22 for converting wind energy into rotational energy. Each blade 24 has a tip 25 positioned at the end thereof which is distant from the hub 22. Although rotor 18 is described and illustrated herein as having three blades 24, rotor 18 may have any number of blades 24. Blades 24 may each have any length (whether or not described herein).

Despite how rotor blades 24 are illustrated in FIG. 1, rotor 18 may have blades 24 of any shape, and may have blades 24 of any type and/or any configuration, whether or not such shape, type, and/or configuration is described and/or illustrated herein. Another example of a type, shape, and/or configuration of rotor blades 24 is a darrieus wind turbine, sometimes referred to as an "eggbeater" turbine. Yet another example of a type, shape, and/or configuration of rotor blades 24 is a savonious wind turbine. Even another example of another type, shape, and/or configuration of rotor blades 24 is a traditional windmill for pumping water, such as, but not limited to, four-bladed rotors having wooden shutters and/or fabric sails. Moreover, wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Referring now to FIGS. 2 and 3, wind turbine 10 includes an electrical generator 26 coupled to rotor 18 for generating electrical power from the rotational energy generated by rotor 18. Generator 26 may be any suitable type of electrical generator, such as, but not limited to, a wound rotor induction generator. Generator 26 includes a stator (not shown) and a rotor (not shown). Rotor 18 includes a rotor shaft 30 coupled to rotor hub 22 for rotation therewith. Generator 26 is coupled to rotor shaft 30 such that rotation of rotor shaft 30 drives rotation of the generator rotor, and therefore operation of generator 26. In the exemplary embodiment, the generator rotor has a rotor shaft 28 coupled thereto and coupled to rotor shaft 30 such that rotation of rotor shaft 30 drives rotation of the generator rotor. In other embodiments, the generator rotor is directly coupled to rotor shaft 30, sometimes referred to as a "direct-drive wind turbine". In the exemplary embodiment, generator rotor shaft 28 is coupled to rotor shaft 30 through a gearbox 32, although in other embodiments generator rotor shaft 28 is coupled directly to rotor shaft 30. More specifically, in the exemplary embodiment, gearbox 32 has a low speed side 34 coupled to rotor shaft 30 and a high speed side 36 coupled to generator rotor shaft 28. The torque of rotor 18 drives the generator rotor to thereby generate variable frequency AC electrical power from rotation of rotor 18. Generator 26 has an air gap torque between the generator rotor and stator that opposes the torque of rotor 18. A frequency converter 38 is coupled to generator 26 for converting the variable frequency AC to a fixed frequency AC for delivery to an electrical load (not shown), such as, but not limited to, a power grid (not shown), coupled to generator 26. Frequency converter 38 may be located anywhere within or remote to wind turbine 10. For example, in the exemplary embodiment, frequency converter 38 is located within a base (not shown) of tower 14.

Wind turbine 10 includes one or more control systems 40 coupled to some or all of the components of wind turbine 10 for generally controlling operation of wind turbine 10 and/or some or all of the components thereof (whether or not such components are described and/or illustrated herein), and in particular for controlling the tip speed of the blades 24 to control the noise generated by the blades 24. For example, in the exemplary embodiment, control system(s) 40 are coupled to a rotor control 41 for generally controlling rotor 18. In the exemplary embodiment, control system(s) 40 is mounted within nacelle 16. However, additionally or alternatively, one or more control systems 40 may be remote from nacelle 16 and/or other components of wind turbine 10. Control system(s) 40 may be used for, but is not limited to, noise level versus power generation monitoring and control including, for example, pitch and speed regulation, high-speed shaft and yaw brake application, yaw and pump motor application, and/or fault monitoring. Alternative distributed or centralized control architectures may be used in some embodiments.

In some embodiments, wind turbine 10 may include a disc brake (not shown) for braking rotation of rotor 18 to, for example, slow rotation of rotor 18, brake rotor 18 against full wind torque, and/or reduce the generation of electrical power from electrical generator 26. Furthermore, in some embodiments, wind turbine 10 may include a yaw system 42 for rotating nacelle 16 about an axis of rotation 44, for changing a yaw of rotor 18, and more specifically for changing a direction faced by rotor 18 to, for example, adjust an angle between the direction faced by rotor 18 and a direction of wind. Yaw system 42 may be coupled to control system(s) 40 for control thereby. In some embodiments, wind turbine 10 may include anemometry 46 for measuring wind speed and/or wind direction. Anemometry 46, in some embodiments, may be coupled to control system(s) 40 for sending measurements to control system(s) 40 for processing thereof. For example, although anemometry 46 may be coupled to control system(s) 40 for sending measurements thereto for controlling other operations of wind turbine 10, anemometry 46 may send measurements to control system(s) 40 for controlling and/or changing a yaw of rotor 18 using yaw system 42. Alternatively, anemometry 46 may be coupled directly to yaw system 42 for controlling and/or changing a yaw of rotor 18.

Wind turbine 10 may also include a plurality of sensors 48 (FIG. 3), each coupled to a corresponding blade 24 for measuring a pitch of each blade 24, or more specifically an angle of each blade 24 with respect to a wind direction and/or with respect to rotor hub 22. Sensors 48 may be any suitable sensor having any suitable location within or remote to wind turbine 10, such as, but not limited to, optical encoders within pitch system 56 (described below). In some embodiments, sensors 48 are coupled to control system(s) 40 for sending pitch measurements to control system(s) 40 for processing thereof.

Wind turbine 10 may also include one or more sensors 50 coupled to generator rotor shaft 28 for measuring a speed of rotation of rotor shaft 28 and/or a torque of generator rotor shaft 28. Sensor(s) 50 may be any suitable sensor having any suitable location within or remote to wind turbine 10, such as, but not limited to, optical encoders, digital proximity sensors, strain gages, and/or tachometers. In some embodiments, sensor(s) 50 are coupled to control system(s) 40 for sending speed measurements to control system(s) 40 for processing thereof.

Wind turbines 10 may also include one or more sensors 52 coupled to rotor shaft 30 for measuring a speed of rotation of generator shaft 28 and/or a torque of rotor shaft 30. Sensor(s) 52 may be any suitable sensor having any suitable location within or remote to wind turbine 10, such as, but not limited to, optical encoders, digital proximity sensors, piezo-electric transducers, strain gages, and/or tachometers. In some embodiments, sensor(s) 52 are coupled to control system(s) 40 for sending measurements to control system(s) 40 for processing thereof.

Wind turbines 10 may also include one or more sensors 54 (FIG. 3) coupled to generator 26 for measuring an electrical power output of generator 26. In some embodiments, sensor(s) 54 are coupled to control system(s) 40 for sending measurements to control system(s) 40 for processing thereof. Sensor(s) 54 may be any suitable sensor having any suitable location within or remote to wind turbine 10, such as, but not limited to, Hall effect current transducers (CTs) and/or capacitive voltage transducers (CVTs).

Wind turbines 10 may also include one or more sensors 55 (FIG. 3) coupled to control system(s) 40 for sending measurements to control system(s) 40 for processing thereof. Sensors 55 may be any suitable sensor having any suitable location within or remote to wind turbine 10, such as, but not limited to, anemometers.

Wind turbine 10 may also include one or more other sensors (not shown) coupled to one or more components of wind turbine 10 and/or the electrical load, whether or not such component(s) are described or illustrated herein, for measuring parameters of such component(s). Such other sensor(s) may include, but are not limited to, sensors configured to measure displacements, yaw, pitch, movements, strain, stress, twist, damage, failure, rotor torque, rotor speed, an anomaly in the electrical load, and/or an anomaly of power supplied to any component of wind turbine 10. Such other sensors may couple to any component of wind turbine 10 and/or the electrical load at any location thereof for measuring any parameter thereof, whether or not such component, location, and/or parameter is described and/or illustrated herein.

Wind turbine 10 includes a variable blade pitch system 56 for controlling, including but not limited to changing, a pitch angle of rotor blades 24 (shown in FIGS. 1-3) in response to a condition such as wind speed.

Referring again to FIG. 3, in some embodiments, control system(s) 40 include a bus 62 or other communications device to communicate information. One or more processor(s) 64 are coupled to bus 62 to process information, including information from anemometry 46, sensors 48, 50, 52, 54 and/or 55, and/or other sensor(s). Control system(s) 40 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or also storage device(s) 68, if included) can also be used to store temporary variables or other intermediate information during execution of instructions by processor(s) 64. Control system(s) 40 may also include one or more read only memories (ROM) 70 and/or other static storage devices coupled to bus 62 to store and provide static (i.e., non-changing) information and instructions to processor(s) 64. Input/output device(s) 72 may include any device known in the art to provide input data to control system(s) 40 and/or to provide outputs, such as, but not limited to, yaw control and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless, providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. Control system(s) 40 may also include a sensor interface 74 that allows control system(s) 40 to communicate with anemometry 46, sensors 48, 50, 52, 54 and/or 55, and/or other sensor(s). Sensor interface 74 can be or can include, for example, one or more analog-to-digital converters that convert analog signals into digital signals that can be used by processor(s) 64.

Figure 4:
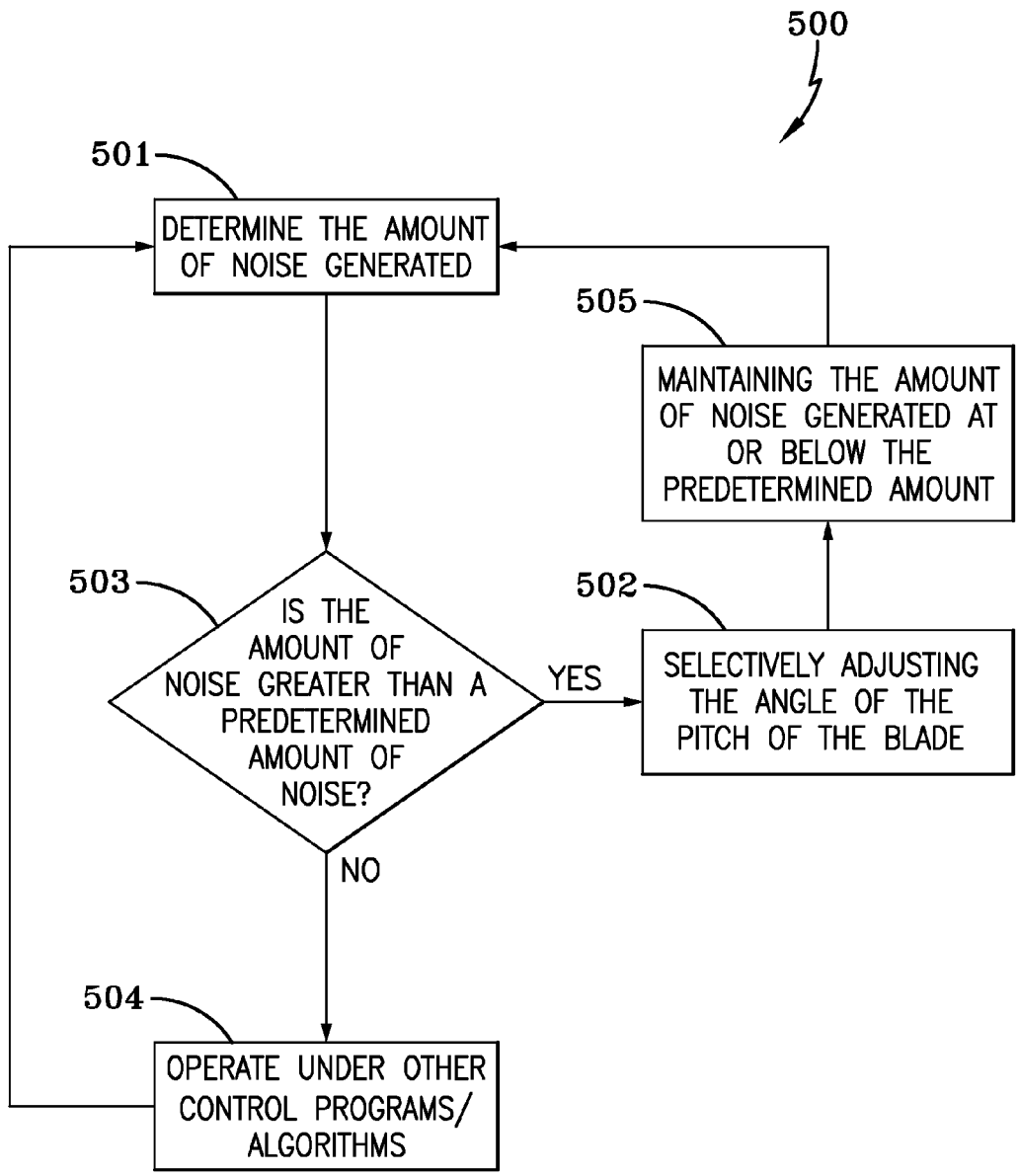
FIG. 4 is a flowchart illustrating an exemplary embodiment of a method for controlling the wind turbine shown in FIGS. 1-3.
Figure 5:
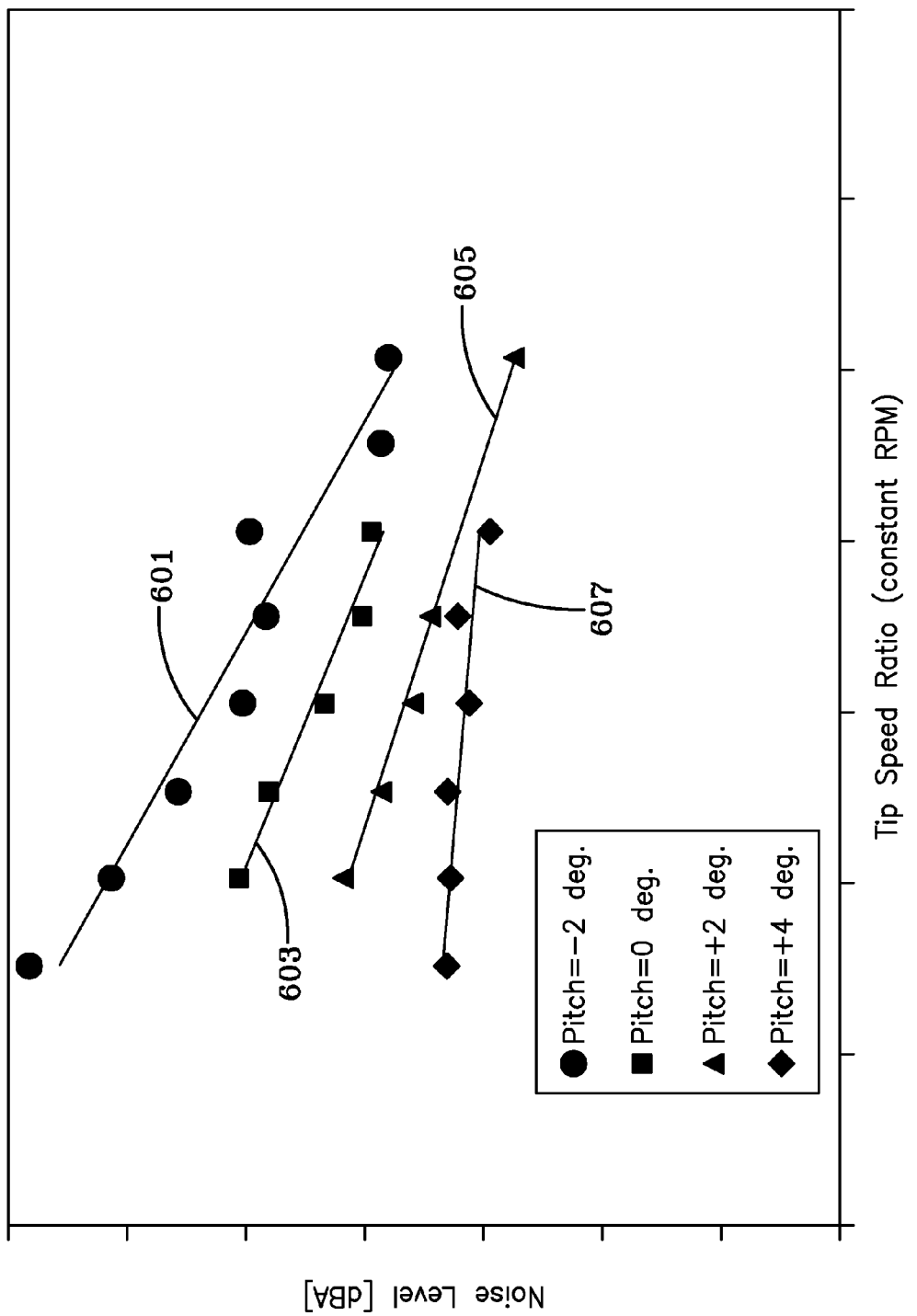
FIG. 5 is a graph illustrating the variation in overall acoustic power of the wind turbine in relation to the tip speed ratio and the pitch angle of the blades, for a given value of rotor speed.

FIG. 4 is a flowchart illustrating an exemplary embodiment of a method 500 for controlling noise generated from wind turbine 10. Method 500 includes determining the amount of noise generated (step 501). The determining of the amount of noise generated (step 501) given the current wind turbine operation parameters can be achieved by measurement, prediction, or calculation. Noise calculation may be performed by measuring or predicting various operating parameters, including, but not limited to, the tip speed or rotational speed, the pitch angle, the power output, and the wind speed. Then, it is determined whether the amount of noise generated is greater than the maximum allowable acoustic emission (step 503). Method 500 further includes controlling an angle of pitch of one or more rotor blades 24 (shown in FIGS. 1 and 2) in response to the noise generated being above the maximum allowable value (step 502) (for example, "Yes" in FIG. 4). Method 500 further includes selectively adjusting the angle of pitch of the blade in response to an amount of noise generated being above a predetermined amount (step 502), and maintaining the amount of noise generated at or below the predetermined amount of noise (step 505). In one embodiment, the selective adjustment of the angle of pitch may be the exclusive method of control, while maintaining the nominal rotor speed and other operating parameters. In another embodiment, the selective adjustment of the angle of pitch may be the primary method of control. In this other embodiment, other methods of control may secondarily attribute to operation too. If the noise generated is below the predetermined level (for example, "No" in FIG. 4), then wind turbine 10 operates under the control programs and/or algorithms defined for normal operation (step 504). Operation under the other control programs and/or algorithms may include adjusting the angle of pitch of one or more rotor blades 24, adjusting the rotational speed of one or more blades 24, and/or other control parameters prior to noise generation reaching the predetermined amount of noise. The selective adjustment of the pitch of one or more blades 24 can correspond to predetermined relationships (for example, as shown in FIG. 5). These adjustments may be limited in number to a number of adjustments during a specified period of time. The period of time can be based upon measurements of time (for example, seconds, minutes, days, or hours) or may be based upon operational conditions (for example, a number of full rotations). In one embodiment, electrical power output of generator 26 may be additionally or alternatively monitored and/or controlled. In another embodiment, wind speed may be additionally or alternatively monitored.

Referring to FIG. 5, the effect of selectively adjusting pitch angle is shown. As shown, the projected noise level is plotted along tip speed ratio for a given value of rotational speed. A first set of points 601 includes points for a pitch angle of −2°. A second set of points 603 includes points for a pitch angle of 0°. A third set of points 605 includes points for a pitch angle of +2°. A fourth set of points 607 includes points for a pitch angle of +4°. The specific pitch angles are illustrations and are not intended to limit the pitch angles that may be selectively adjusted. Similar plots can be obtained for all values of rotational speeds at which the wind turbine can potentially operate. As tip speed ratio decreases, the noise generated increases. With the tip speed ratio being the ratio of the blade-tip speed by the wind speed at hub height, a plot such as is shown in FIG. 5 permits the noise level to be controlled at various wind speeds based primarily upon selectively adjusting the pitch angle. For example, given a maximum allowable noise level (for example, a regulatory noise limit), a curve corresponding to an operational pitch may be selected based on the tip speed ratio at which the wind turbine is operating. In response, the controller may cause the blade angle to be adjusted to the pitch corresponding to the selected curve, so that the acoustic emission does not exceed the threshold level.

Although the embodiments described and/or illustrated herein are described and/or illustrated with respect to a wind turbine, and more specifically controlling rotor speed of a wind turbine, practice of the embodiments described and/or illustrated herein is not limited to wind turbines. Rather, the embodiments described and/or illustrated herein are applicable to controlling a speed of any rotor having one or more blades.

While the disclosure has been described with reference to a preferred embodiment, it will be understood by those skilled in the art that various adjustments may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method for controlling noise generated from a wind turbine having a blade attached to a rotor having a rotor shaft and a generator in communication with the rotor shaft, the method comprising:
   selectively adjusting the angle of pitch of the blade in response to an amount of noise generated being above a predetermined amount;
   maintaining the amount of noise generated at or below the predetermined amount of noise; and
   wherein the selective adjustment is limited to a number of adjustments during a predetermined period of time.

2. The method of claim 1, wherein the selective adjustment of the pitch of the blade corresponds to a relationship between the amount of noise generated, the angle of pitch of the blade, an operational tip speed ratio, and rotor speed.

3. The method of claim 1, wherein the maintaining the amount of noise comprises maintaining a nominal tip speed of the blade.

4. The method of claim 1, wherein the controlling the wind turbine is primarily performed by the selective adjustment of the angle of pitch of the blade.

5. The method of claim 1, wherein the predetermined period of time exceeds a full rotation of the blade.

6. The method of claim 1, wherein the wind turbine is a pre-existing wind turbine.

7. The method of claim 1, further comprising:
   determining wind speed; and
   controlling the wind turbine in response to the determined wind speed being above a predetermined wind speed value.

8. The method of claim 1, further comprising:
   determining wind speed;
   determining a relationship between wind turbine acoustic power, the angle of pitch of the blade, and wind speed; and
   providing a signal to a controller configured for controlling the wind turbine in response to the amount of noise generated being above the predetermined amount of noise, the signal indicating whether the determined wind speed is above a predetermined wind speed value.

9. The method of claim 1, further comprising:
   determining an electrical power output of the generator;
   determining a relationship between wind turbine acoustic power, the angle of pitch of the blade, and wind speed; and
   adjusting the angle of pitch of the blade in response to the determined power output being above a predetermined amount of electrical power.

10. A wind turbine, comprising:
    at least one blade operably mounted on the wind turbine, the at least one blade attached to a rotor having a rotor shaft, the rotor shaft in communication with a generator;
    the generator configured for converting torque into electrical power;
    a controller configured for selectively adjusting an operating parameter in response to noise generated being above a predetermined value;
    the operating parameter comprising an angle of pitch of the at least one blade; and
    wherein the selective adjustment is limited to a number of adjustments during a predetermined period of time.

11. The wind turbine of claim 10, wherein the selective adjustment of the pitch of the blade corresponds to a relationship between acoustic power radiated by the wind turbine, the pitch of the blade, an operational tip speed ratio, and rotor speed.

12. The wind turbine of claim 10, wherein the controller is configured for selective adjustment of the angle of pitch of the blade.

13. The wind turbine of claim 10, wherein the controller is configured for calculating the noise generated based upon a value of a rotational speed, a second value of wind speed, and a third value of the angle of pitch of the blade.

14. The wind turbine of claim 10, wherein the controller is configured for selectively adjusting the blade pitch angle in response to the calculated noise in the current operating conditions being above the predetermined value.

15. The wind turbine of claim 10, wherein the period of time exceeds a full rotation of the blade.

16. The wind turbine of claim 10, wherein the controller is configured for receiving a signal, the signal indicating whether a determined wind speed is above a predetermined wind speed value.

17. The wind turbine of claim 10, wherein the controller is configured for receiving a signal, the signal being related to electrical power output of the generator being above a predetermined amount of electrical power output and the controller further being configured for adjusting the angle of pitch of the blade in response to the determined electrical output being above the predetermined amount of electrical power.

18. A wind turbine farm, comprising:
a plurality of wind turbines, at least one of the plurality of wind turbines comprising:
at least one blade operably mounted on the wind turbine, the at least one blade attached to a rotor having a rotor shaft, the rotor shaft in communication with a generator;
the generator configured for converting torque into electrical power;
a controller capable of selectively adjusting an operating parameter in response to noise generated being above a predetermined amount of noise and maintaining the amount of noise generated at the predetermined amount of noise;
the operating parameter comprising an angle of pitch of the at least one blade; and
wherein the selective adjustment is limited to a number of adjustments during a predetermined period of time.

* * * * *